US010053070B2

(12) United States Patent
Kumar et al.

(10) Patent No.: US 10,053,070 B2
(45) Date of Patent: Aug. 21, 2018

(54) SYSTEM AND METHOD FOR TRACTION CONTROL (71) Applicant: GENERAL ELECTRIC COMPANY, Schenectady, NY (US)

(72) Inventors: Ajith Kuttannair Kumar, Erie, PA (US); Bret Dwayne Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 15/159,394

(22) Filed: May 19, 2016

(65) Prior Publication Data

US 2017/0334415 A1    Nov. 23, 2017

(51) Int. Cl.
*B60T 8/175* (2006.01)
*B60T 8/17* (2006.01)
*B60T 8/171* (2006.01)

(52) U.S. Cl.
CPC .............. *B60T 8/175* (2013.01); *B60T 8/171* (2013.01); *B60T 8/1705* (2013.01); *B60T 2270/20* (2013.01)

(58) Field of Classification Search
CPC .............................. B60T 8/1705; B60T 8/175
USPC ...................................................... 701/20, 71
See application file for complete search history.

(56) References Cited

U.S. PATENT DOCUMENTS

| 4,347,569 | A | 8/1982 | Allen, Jr. et al. |
| 4,392,091 | A * | 7/1983 | Roberts ..................... B60L 3/10 318/52 |
| 5,661,378 | A | 8/1997 | Hapeman |
| 5,752,212 | A | 5/1998 | Wood et al. |
| 6,267,062 | B1 | 7/2001 | Hamilton, Jr. |
| 6,499,815 | B1 | 12/2002 | Daigle |
| 7,064,507 | B2 | 6/2006 | Donnelly et al. |
| 8,196,519 | B2 | 6/2012 | Kumar et al. |
| 8,935,983 | B2 | 1/2015 | Kumar et al. |
| 2010/0250083 | A1 * | 9/2010 | Takahashi ............. B60T 8/1755 701/70 |
| 2014/0303817 | A1 * | 10/2014 | Mayer ................... B60T 8/1705 701/19 |

OTHER PUBLICATIONS

Wikipedia, Wheel Slide Protection, Apr. 23, 2015, Wikipedia Online Encyclopedia.*

(Continued)

*Primary Examiner* — Nadeem Odeh
(74) *Attorney, Agent, or Firm* — GE Global Patent Operation; John A. Kramer (57) ABSTRACT A system includes a plurality of wheels, a braking system, and one or more sensors. The plurality of wheels includes a guardian wheel and at least one non-guardian wheel and is disposed on a wheeled vehicle. The braking system is operatively connected to the guardian and non-guardian wheels and applies a first braking force to the at least one non-guardian wheel and a second braking force to the guardian wheel. The second braking force increases a slide risk of the guardian wheel beyond a slide risk of the at least one non-guardian wheel. One or more sensors disposed within the wheeled vehicle detect sliding of the guardian wheel allowing a corrective action to be taken to prevent sliding of the at least one non-guardian wheel.

20 Claims, 5 Drawing Sheets

(56) References Cited

OTHER PUBLICATIONS

Barna, Control System of Wheel Slide Protection Devices for Rail Vehicles Meeting the Requirements of European Normative Documents, 2012, Mechanics—Technical Transactions, Issue 14, Year 109.*

* cited by examiner

SYSTEM AND METHOD FOR TRACTION CONTROL

BACKGROUND

Technical Field

Embodiments of the invention relate generally to traction control in wheeled vehicles.

Discussion of Art

Some types of vehicles may use wheels to traverse a surface. In such vehicles, a wheel may have a surface formed by the exterior of the circumference of the wheel, known as the contact surface that contacts with the traversed surface. The part of the contact surface that is in contact with the traversed surface at any particular moment is known as the contact area. A frictional force exists between the contact area and the traversed surface referred to as the wheel-contact-surface frictional force.

Certain wheeled vehicles control their speed by applying accelerating forces, e.g., propulsion and braking forces, to one or more wheels. However, when an acceleration force that exceeds the wheel-contact-surface frictional force is applied to a wheel, the wheel may slip in relation to the traversed surface. Wheel slip occurs when the wheel contact area does not track the traversed surface. Wheel slip may result in wheel spin, i.e., "positive wheel creep," when the applied acceleration force is a propulsion force or in wheel slide, i.e., "negative wheel creep," when the applied acceleration force is a braking force. Wheel spin occurs when a wheel rotates on its axle without tracking the traversed surface such that the rotational speed of the wheel exceeds the corresponding forward velocity of the wheeled vehicle. A partial wheel slide occurs when a wheel rotates at a speed slower than that required to result in no relative motion at the contact area. A full wheel slide occurs when a wheel has stopped rotation completely while the vehicle is still in motion. This is commonly referred to as wheel lockup or locking/locked wheel.

Wheel slide may be potentially problematic as the sliding or spinning of wheels along the traversed surface may cause excessive wear, flat spots and/or other types of damage to a wheel. For example, in a full wheel slide, a high amount of abrasive and thermal energy is applied at a singular wheel tread location that may cause flat spots and/or other types of damage to a wheel. In particular, the high temperatures created between a sliding and/or spinning wheel and the traversed surface can cause spalling, i.e., a transformation of a thin surface layer of the wheel. Additionally, wheel slide can reduce the ability of an operator, e.g., human and/or machine, to control/drive the wheeled vehicle.

Aggressive application of accelerating forces on a wheel by an operator may increase the chance that wheel slide will occur. Operators, however, are not always aware that they are aggressively applying an accelerating force to a wheel. Accordingly, operators sometimes apply braking forces in excess of what is needed to maintain adequate control of a wheeled vehicle or in excess of the available friction between the wheel contact area and the traversed surface. Such braking may increase the wear on the wheels resulting in reduced wheel service life and increased operational costs of the wheeled vehicle. Moreover, the design of certain frictional braking systems is such that an operator's ability to arrest and/or control a wheel slide is limited.

In view of the above, there may be a need for a system and method which differ from those systems and methods that are currently available.

BRIEF DESCRIPTION

In an embodiment, a system (e.g., vehicle system) includes a plurality of wheels, a braking system, and one or more sensors. The plurality of wheels includes a guardian wheel and at least one non-guardian wheel, and is disposed on a wheeled vehicle. The braking system is operatively connected to the guardian and non-guardian wheels and applies a first braking force to the at least one non-guardian wheel and a second braking force to the guardian wheel. The second braking force increases a slide risk of the guardian wheel beyond a slide risk of the at least one non-guardian wheel. One or more sensors disposed within the wheeled vehicle detect sliding of the guardian wheel allowing a corrective action to be taken to prevent sliding of the at least one non-guardian wheel.

In an embodiment, a method includes detecting that a first braking force has been applied to one or more non-guardian wheels of a plurality of wheels disposed on a wheeled vehicle. The method further includes applying a second braking force to a guardian wheel, the second braking force increasing a slide risk of the guardian wheel beyond a slide risk of the one or more non-guardian wheels. The method further includes detecting sliding of the guardian wheel.

In an embodiment, a method includes detecting that a first braking force has been applied to one or more non-guardian wheels of a plurality of wheels disposed on a wheeled vehicle, each of the plurality of wheels having an adhesion requirement. The method further includes estimating the adhesion requirement for each of the non-guardian wheels. The method further includes taking a guardian action when the estimated adhesion requirement of at least one of the non-guardian wheels exceeds an upper threshold.

In an embodiment, a system (e.g., vehicle system) includes a plurality of wheels and a sensor. The plurality of wheels includes a guardian wheel and one or more non-guardian wheels. The sensor detects sliding of the guardian wheel. When a first braking force is applied to the one or more non-guardian wheels, a second braking force is applied to the guardian wheel. The second braking force increases an adhesion requirement between a contact area of the guardian wheel and a surface.

DRAWINGS

The present invention will be better understood from reading the following description of non-limiting embodiments, with reference to the attached drawings, wherein below.

DETAILED DESCRIPTION

Embodiments of the invention relate to vehicle control. Certain embodiments relate to systems and methods for traction control in a wheeled vehicle having traction motors. For example, in an embodiment, a system includes a plurality of wheels, a braking system, and one or more sensors. The plurality of wheels includes a guardian wheel and at least one non-guardian wheel and is disposed on a wheeled vehicle. The braking system is operatively connected to the guardian and non-guardian wheels and applies a first braking force to the at least one non-guardian wheel and a second braking force to the guardian wheel. The second braking force increases a slide risk of the guardian wheel beyond a slide risk of the at least one non-guardian wheel. One or more sensors disposed within the wheeled vehicle detect sliding of the guardian wheel allowing a corrective action to be taken to prevent sliding of the at least one non-guardian wheel.

In exemplary instances, a traversed surface, route surface, and/or a surface can be a metal rail, pavement, earth and/or any other type of surface over which a wheeled vehicle may traverse/move across as it travels along a route. Rail vehicle can be a locomotive, switcher, shunter, and the like and includes both freight haulage and passenger locomotives, which themselves may be diesel electric or all electric, and that may run on either AC or DC electrical power. Onboard refers to on and/or within a wheeled vehicle. The terms rail and track may be used interchangeably throughout, and where practical refers to routes, pathways and roads, and the opposite is true. The term adhesion requirement means the amount of adhesion required between the contact area of a wheel and the traversed surface in order to prevent the wheel from slipping. The terms "slide" and "sliding", as used herein with respect to wheels, refer to the pre/partial sliding and/or full/complete slide of a wheel. Pre-sliding is defined herein to mean the stages of a wheel slide, before the onset of a full wheel slide, where the rotational speed of a wheel begins to slow below synchronous speed.

The term slide risk refers to the risk that a wheel will enter a slide. Although discussed in more detail elsewhere herein, the term friction modifying material or friction modifier may be water, steam, air, oil, a lubricant, or may be the removal or application of sand, water, snow or a friction enhancing agent that exists on the surface at the time. The terms electrically coupled, electrically connected, and electrical communication mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

Figure 1:
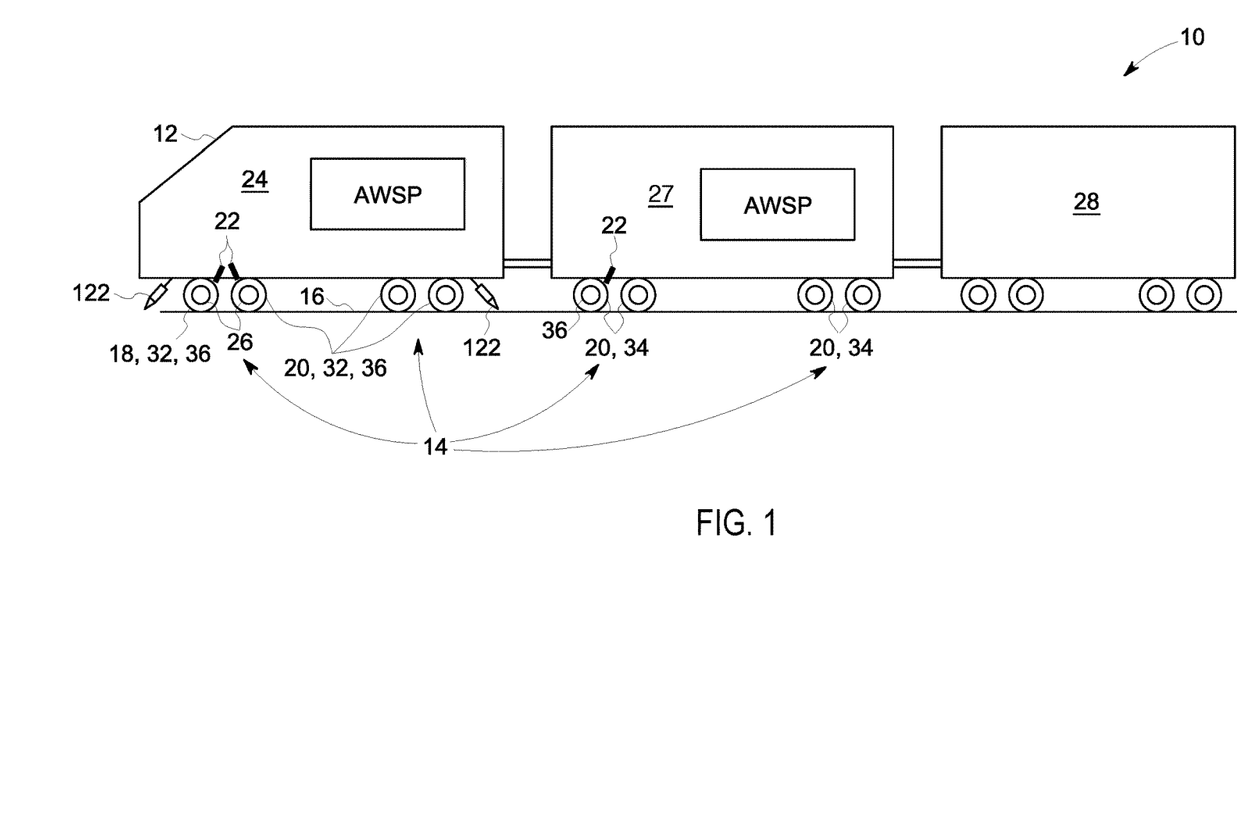
FIG. 1 is a diagram of an exemplary wheeled vehicle that incorporates a traction control system in accordance with embodiments of the invention.

Referring now to FIG. 1, embodiments of a traction control system 10, also referred herein to as an active wheel slide protection ("AWSP") system, are utilized onboard a wheeled vehicle 12. The AWSP system includes a plurality of wheels 14 disposed on the wheeled vehicle so as to allow the wheeled vehicle to move across/traverse a surface 16. Each of the wheels has an adhesion requirement with respect to the traversed surface. The plurality of wheels includes at least one guardian wheel 18 and one or more non-guardian wheels 20. As used herein, the term "guardian wheel" refers to a wheel that is intended to provide a warning that other, non-guardian wheels, are about to slide.

The AWSP system further includes one or more sensors 22 disposed onboard the wheeled vehicle that detect sliding and/or rotational speed for the guardian and/or non-guardian wheels. When a braking force is applied to the guardian wheel and/or the one or more non-guardian wheels, the guardian wheel is made to have a higher likelihood of sliding prior to the one or more non-guardian wheels by applying another braking force to the guardian wheel such that the adhesion requirement of the guardian wheel is higher than the adhesion requirements of the non-guardian wheels, i.e., the cumulative braking force applied to the guardian wheel is greater than that which is applied to the non-guardian wheels. However, it is to be understood that in certain embodiments, i.e., where the weight on the non-guardian wheels exceeds the weight on the guardian wheel, the cumulative force applied to increase the adhesion requirement of the guardian wheel close to and/or beyond the available frictional force, supplied by the traversed surface, may be less than or equal to the force applied to the non-guardian wheels. In an embodiment, the braking force applied to the non-guardian wheel(s) is referred to as the "first braking force" and the braking force applied to the guardian wheel is the "second braking force."

Configuring the guardian wheel to have an adhesion requirement higher than the adhesion requirement of the non-guardian wheels increases the chance that the guardian wheel will slide before any of the non-guardian wheels. Thus, detecting sliding of the guardian wheel serves as a warning indicator that the non-guardian wheels are about to slide. Accordingly, such a warning affords time for slide mitigating action(s) to be taken that prevent and/or reduce the sliding of the non-guardian wheels.

As will be appreciated, in embodiments, the wheeled vehicle includes a chassis 24 to which the plurality of wheels is coupled via one or more axles 26. In further embodiments, the wheeled vehicle may have one or more car or chassis 24, 27, 28. In such embodiments, the wheels of the one or more chassis may be included in / protected by the AWSP system. For example, as shown in FIG. 1, the wheeled vehicle may be a train and the traversed surface may be one or more rails. The train may have one or more locomotives 24 and one or more cars 27 and 28 over which the AWSP system is distributed. However, it is to be understood that not all cars/chassis and/or wheels need to be incorporated into the AWSP system.

The plurality of wheels may include one or more powered wheels 32, one or more non-powered wheels 34, and one or more braked wheels 36. Powered wheels are wheels that a propulsion force may be applied to. In embodiments, the propulsion force may be generated by an engine housed within the wheeled vehicle and distributed to the powered wheels via a drive shaft, or other similar mechanical means. In other embodiments, the propulsion force may be generated by one or more traction motors. Non-powered wheels are wheels to which a propulsion force is not applied to. For example, in many types of trains, the wheels of the cars trailing the locomotive are non-powered wheels. Braked wheels are wheels to which one or more braking forces may be applied to.

As stated, the guardian wheel is made to have a higher likelihood of sliding prior to the non-guardian wheels. This is accomplished by increasing the adhesion requirement of the guardian wheel with respect to the traversed surface via application of a braking force. For example, in embodiments, application of a second braking force to the guardian wheel increases the amount of adhesion required between the contact area of the guardian wheel and the traversed surface necessary to keep the guardian wheel from sliding along the traversed surface. If the first braking force continues to be applied after the adhesion requirement of the guardian wheel has been increased beyond that of the non-guardian wheels, then it becomes highly likely that the guardian wheel will be the first wheel to slide. The more the adhesion requirement of the guardian wheel exceeds the adhesion requirement of the non-guardian wheels, the larger the amount of time between sliding of the guardian wheel and sliding of the non-guardian wheels. In other words, the warning time afforded by the guardian wheel can be increased by increasing the difference between the adhesion requirement of the guardian wheel and the non-guardian wheels.

In embodiments, the adhesion requirement of the guardian wheel may be increased so that it is at a maximum level, the maximum level being the amount of adhesion required just prior to sliding of the guardian wheel. In other words, the amount of adhesion required to prevent sliding of the guardian wheel is raised to a point just before the wheel-contact-surface frictional force is exceeded.

The sensor may be located onboard the wheeled vehicle and may detect sliding of the guardian wheel via assessing the rotational speed of the guardian wheel. For example, the sensor may determine and/or estimate a speed of the guardian wheel based at least in part on a scaled or unscaled speed of a traction motor associated with the guardian wheel. The sensor may detect sliding of the guardian wheel by comparing a scaled or unscaled speed of the traction motor to a measured or estimated speed of the wheeled vehicle. In one embodiment, a sensor may detect sliding of the wheel by comparing the measured rotational speed of the guardian wheel to the velocity of the wheeled vehicle. The velocity of the wheeled vehicle may be obtained via a GPS signal, by estimation based at least in part on the speed of one or more wheels of the plurality, and/or other means. In embodiments, the sensor may estimate the rotational speed of the guardian wheel based at least in part on the velocity of the wheeled vehicle. As will be appreciated, additional slide measuring sensors may include voltage and current measurements on power electronic components that drive the traction motor, measurement of waveforms produced by the traction motor itself, measurements of revolutions per minute, and the like.

For example, in an embodiment, the sensor may detect that the guardian wheel is sliding if the guardian wheel has a rotational speed of eighty-nine (89) miles/hour (MPH) and the vehicle is traveling at ninety (90) MPH. As is to be understood, while the previous example defined a one (1) MPH difference between vehicle speed and guardian wheel rotational speed as a slide, other embodiments may utilize larger or smaller differences/spreads between the vehicle speed and the rotational speed of the guardian wheel.

In addition to detecting sliding and/or rotational speed for the guardian and/or non-guardian wheels, the one or more sensors may measure and/or detect at least one of applied propulsion force, applied braking force, and applied weight of the plurality of wheels. Additionally, the one or more sensors may further detect the condition of the traversed surface. For example, the one or more sensors may detect whether the traversed surface is wet, icy, hot, cold, slick and/or other types of surface conditions. The one or more sensors may further detect a gradient of the traversed surface.

Figure 2:
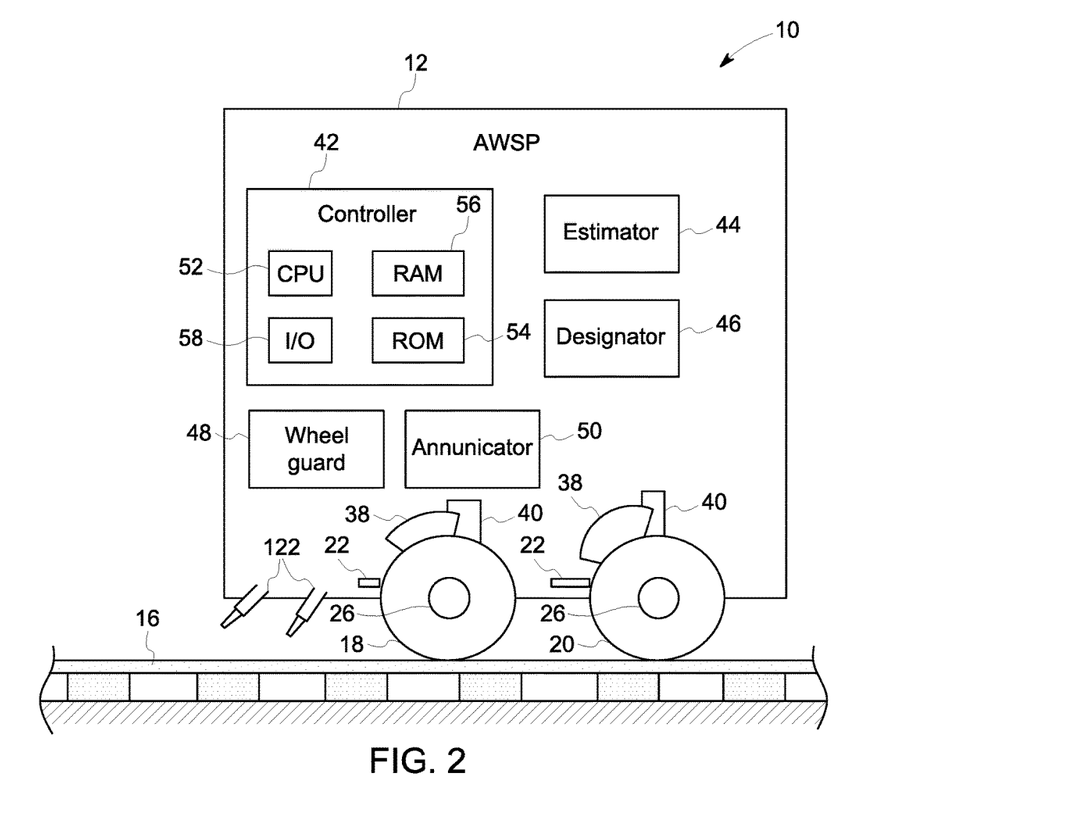
FIG. 2 is a block diagram of the exemplary traction control system of FIG. 1.

As illustrated in FIG. 2, the AWSP system may further include a first brake 38, a second brake 40, a controller 42, an estimator 44, a designator 46, a wheel guard 48, and/or an annunciator 50 disposed within the wheeled vehicle.

The first braking force may be provided by the first brake. The first brake may be a friction based brake, e.g., air brake, a dynamic brake, e.g., an electronic dynamic brake similar to those commonly found on wheeled vehicles that use traction motors, or a hybrid brake that utilizes both frictional and dynamic components. In embodiments, the first brake is the primary brake used by the operator to reduce the speed of the wheeled vehicle.

In addition to the first brake, and associated first braking force, the second brake may provide the second braking force. The second brake may be a friction based brake, e.g. air brake, a dynamic brake, e.g., air brake, a dynamic brake, e.g., an electronic dynamic brake similar to those commonly found on wheeled vehicles that use traction motors, or a hybrid brake that utilizes both frictional and dynamic components. In embodiments, the second brake is a supplemental brake to the first brake for the wheeled vehicle.

As will be appreciated, in embodiments, the first brake and/or the second brake may apply the first and/or second braking force. For example, the second braking force applied to a guardian wheel may be a cumulative force resulting from the application of both the first and second brakes to the guardian wheel. Alternatively, one of the first or second brakes may be a dedicated guardian wheel brake that applies a single braking force to the wheel. Regardless of which braking system applies which force, the braking force received by a guardian wheel, e.g., the second braking force, is applied such that the adhesion requirement of the guardian wheel is increased such that the slide risk of the guardian wheel, e.g. the risk that the guardian wheel will enter a slide, becomes larger than the slide risk of the non-guardian wheels.

Accordingly, suitable traction motors may be the primary motor or a supplemental motor of the wheeled vehicle, and may drive a single wheel or multiple wheels, e.g., two wheels on a common axle. In one embodiment, each wheel of the plurality of wheels may be connected to a corresponding respective traction motor. In other embodiments, however, only a few, i.e., less than all, of the wheels of the plurality may be connected to a traction motor. Suitable traction motors may be highly responsive, i.e., very little time elapses between when the controller calls for the traction motor to apply a specific amount of torque, and the time it takes for the traction motor to actually apply the specified amount of torque to the wheel. Suitable traction motors may be an Alternating Current (AC) induction motor connected to a power supply capable of providing electrical excitation which develops a controlled motoring torque. Other suitable traction motors may be permanent magnet motors, hydraulic motors, and/or pneumatic motors.

In order to facilitate coordination among the various components of the AWSP, the controller may be used to control the actions of the other components of the AWSP system. The controller may be electrical, mechanical, and/or a combination thereof. For example, in embodiments, the controller may be a dedicated/specialized electrical logic circuit. In other embodiments, the controller may be a general purpose controller that is programed with one or more instructions. In such embodiments, the controller may include at least one processor ("CPU") 52 (e.g., one or more processors), a read only memory ("ROM") 54, a random access memory ("RAM") 56, and one or more input/output ports 58. The controller may be in communication with one or more of the other components of the AWSP system and/or the operator via the input/output ports 58.

The estimator estimates the adhesion requirement for each of the plurality of wheels. However, it is to be appreciated that in other embodiments, the estimator may only estimate the adhesion requirement for a subset of the plurality of wheels. In embodiments, the estimator may be mechanical, electrical, and/or a combination thereof. The estimator may be in communication with the one or more sensors such that the estimated adhesion requirements for the wheels are based at least in part on the data collected by the sensors. For example, the estimated adhesion requirements for the wheels may be based at least in part on one of the applied first braking force, wheel diameter, axle weight, ground speed, rotational speed, surface gradient, and/or the configuration of the wheeled vehicle. In embodiments, the estimator may be incorporated into the controller.

The designator designates one or more of the plurality of wheels as guardian wheels. The designator may be in communication with the estimator such that the designation of the one or more guardian wheels is based at least in part on the estimated adhesion requirements estimated by the estimator. The designator may be mechanical, electrical, and/or a combination thereof. In embodiments, the designator may be incorporated into the controller.

The wheel guard prevents damage to the guardian wheel by reducing the magnitude of the second braking force applied to the guardian wheel or by applying a motoring torque to the guardian wheel. The intent of reducing the second braking force or applying motoring torque is to reduce the overall braking force, and thus the required adhesion requirement, on the guardian wheel. When this occurs, the sliding of the guardian wheel is eliminated and/or greatly reduced. In embodiments, the wheel guard may be in communication with the controller and/or sensors such that the wheel guard reduces the second braking force or applies motoring torque when the sensors detect sliding of the guardian wheel. The wheel guard may be mechanical, electrical, and/or a combination thereof. In embodiments, the wheel guard may be incorporated into the controller.

The annunciator may be in communication with the sensors and/or controller, such that when the sensors detect sliding of the guardian wheel, the annunciator annunciates/signals via an indicator light, sounding alarm, electronic signal, etc. that the guardian wheel is sliding. Announcing that the guardian-wheel is sliding allows the operator to manually (or automatically in the case of a computerized operator) reduce the magnitude of the first applied braking force prior to sliding of the non-guardian wheels. In embodiments, the annunciator may annunciate, e.g., in a manner similar to annunciation of guardian wheel sliding, that the wheel guard has reduced the magnitude of the applied second braking force below a lower threshold or has applied motoring torque above an upper threshold.

Figure 3:
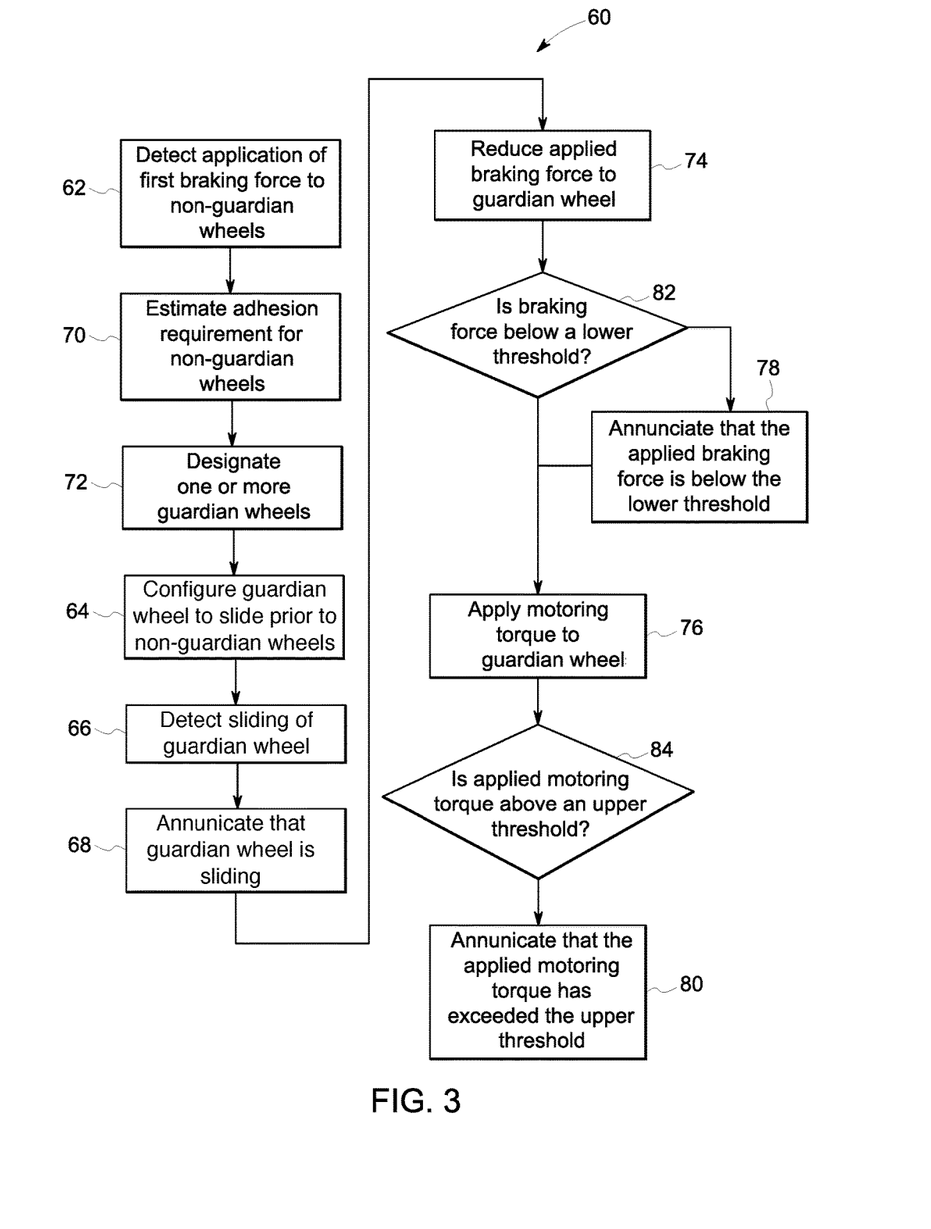
FIG. 3 is flow chart showing a method for providing traction control for the wheeled vehicle of FIG. 1 in accordance with embodiments of the invention.

Referring now to FIG. 3, a method 60 for providing active wheel slide protection for the wheeled vehicle according to an embodiment is shown. The method includes detecting 62 that the first braking force has been applied to one or more non-guardian wheels, configuring 64 the guardian wheel to slide prior to the non-guardian wheels, and detecting 66 sliding of the guardian wheel.

Detecting that the first braking force has been applied to one or more non-guardian wheels may be accomplished by the one or more sensors. As will be appreciated, configuring the guardian wheel to slide prior to the non-guardian wheels may be accomplished by increasing the adhesion requirement of the guardian wheel beyond the adhesion requirements of the non-guardian wheels. In embodiments, the adhesion requirement of the guardian wheel may be increased to a maximum level. Sensors may be used to detect sliding of the guardian wheel. For example, in embodiments, the sensors may detect that the rotational speed of the guardian wheel is at or near zero (0) MPH.

As also shown in FIG. 3, the method may further include annunciating 68 that the guardian wheel is sliding, estimating 70 the adhesion requirement for each of the plurality of wheels, and/or designating 72 one of the plurality of wheels as a guardian wheel.

Annunciating that the guardian wheel is sliding may be effected by an annunciator which may include a sounding, lighting and/or electrical indication. The adhesion requirement for each of the plurality of wheels may be estimated by an estimator. Additionally, the designator may designate one of the plurality of wheels as a guardian wheel.

In embodiments, the method may also include reducing 74 the magnitude of the second braking force applied to the guardian wheel and/or applying 76 a motoring torque to the guardian wheel. Accordingly, the method may further include annunciating 78 and/or 80 that the magnitude of the second applied braking force has been reduced below a lower threshold 82 and/or that the applied motoring torque has exceeded an upper threshold 84.

Figure 4:
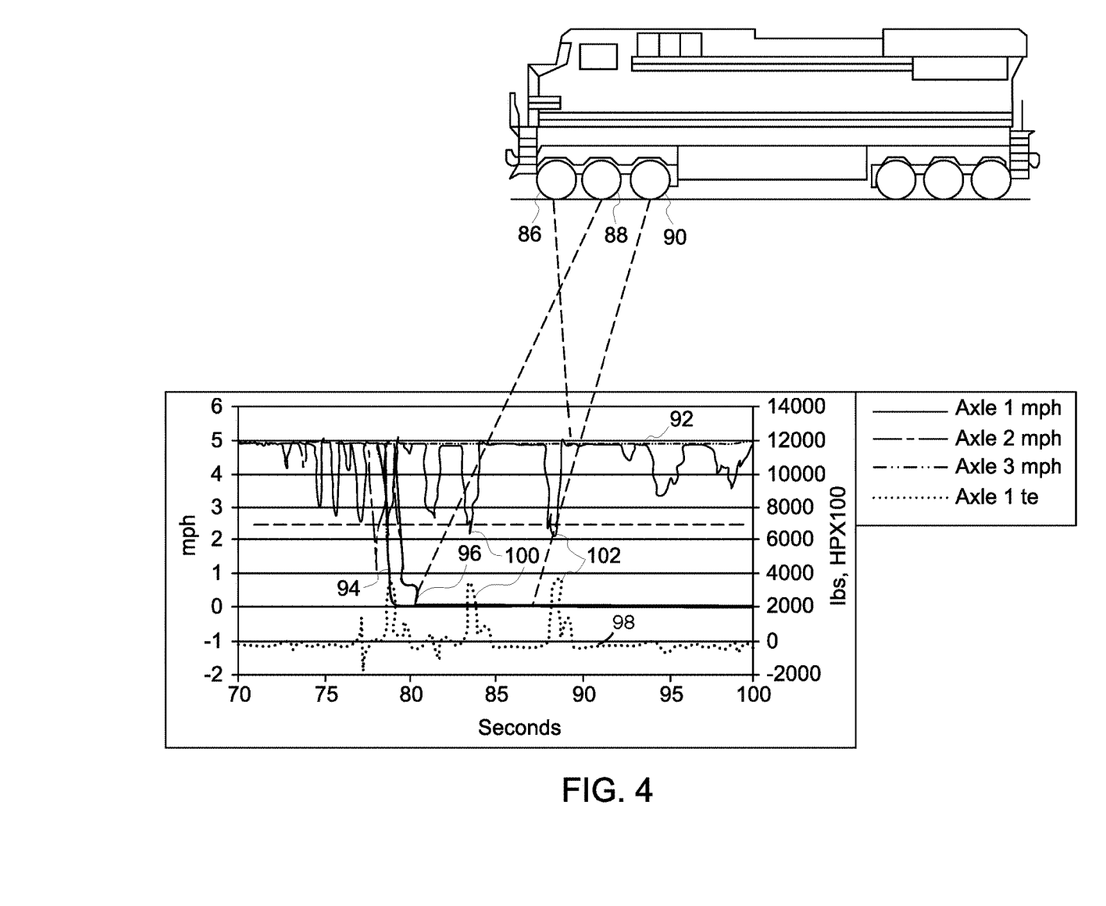
FIG. 4 is a graphical chart that depicts the prevention of wheel slide by the traction control system of FIG. 1 in accordance with embodiments of the invention.

As best seen in FIG. 4, reducing the applied second braking force and/or applying motoring torque to a guardian wheel (86 in FIG. 4) greatly reduces the risk that the guardian wheel 86 will slide as compared to guardian wheels (88 and 90 in FIG. 4) where the applied second braking force is not reduced and/or a motoring torque is not applied. In particular, FIG. 4 depicts the wheel speeds 92, 94 and 96 for three guardian wheels 86, 88, and 90, respectively, over the course of one hundred seconds of an applied second braking force. Wheel 86 is protected by a wheel guard in accordance with embodiments of the invention. Wheels 88 and 90 are not protected by a wheel guard in accordance with embodiments of the invention.

As shown in FIG. 4, at approximately seventy-three seconds, the rotational speed of wheels 86, 88 and 90 begin to slow. At approximately eighty seconds, the rotational speeds of wheels 88 and 90 reach zero (0) MPH indicating that wheels 88 and 90 are sliding/locked. However, as can be seen by line 98, which depicts the magnitude of motoring torque applied to wheel 86 by the wheel guard, the wheel guard applies motoring torque to wheel 86 so as to keep the speed of wheel 86 from reaching zero (0) MPH. As can be seen, the wheel guard continues to apply motoring torque to wheel 86 at various times as shown by the peaks and valleys at 100 and 102. Notably, the wheel guard prevents the rotational speed of wheel 86 from ever reaching zero (0) MPH.

Figure 5:
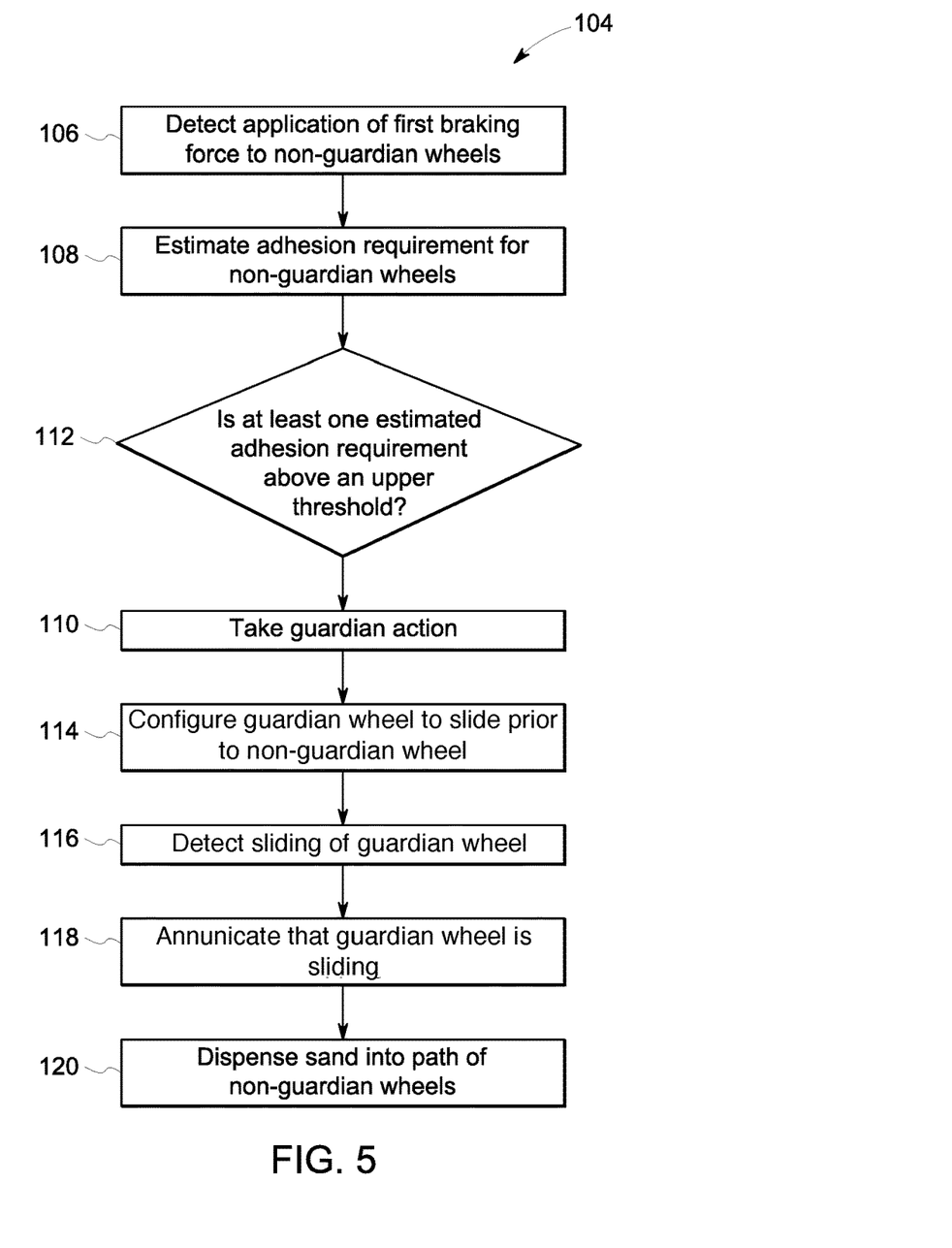
FIG. 5 is flow chart showing another method for providing traction control for the wheeled vehicle of FIG. 1 in accordance with embodiments of the invention.

Turning now to FIG. 5, another method 104 for providing active wheel slide protection for the wheeled vehicle according to an embodiment is shown. The method may include detecting 106 that a first braking force has been applied to one or more non-guardian wheels, estimating 108 the adhesion requirement for each of the non-guardian wheels, and taking 110 a guardian action. Detecting the application of a first braking force and estimating the adhesion requirements for the non-guardian wheels may be accomplished in the manner previously described above with respect to detecting the application of the first braking force and estimating the adhesion requirements for the non-guardian wheels.

Taking a guardian action may be accomplished when one or more of the estimated adhesion requirements for the non-guardian wheels exceeds an upper threshold 112. As used herein a "guardian action" is an action and/or process designed to prevent sliding of the non-guardian wheels. As further shown in FIG. 5, the guardian action may include configuring 114 a guardian wheel to slide prior to the non-guardian wheels. Accordingly, taking the guardian action may further include detecting 116 that the guardian wheel is sliding and annunciating 118 that the guardian wheel is sliding. In embodiments, taking the guardian action may include dispensing 120 a friction modifier, e.g. sand, via one or more nozzles (122 in FIGS. 1 and 2) disposed on the wheeled vehicle, into the path of motion of one or more of the plurality of wheels.

It is to be understood that the traction control/AWSP system may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the AWSP system may include at least one processor, system memory including random access memory (RAM) and read-only memory (ROM), an input/output controller, and one or more data storage structures. All of these latter elements may be in communication with the at least one processor to facilitate the operation of the AWSP system as discussed above. Suitable computer program code may be provided for executing numerous functions, including those discussed above in connection with the AWSP system and methods. The computer program code may also include program elements such as an operating system, a database management system and "device drivers" that allow the AWSP system, controller estimator, wheel guard and/or designator to interface with computer peripheral devices, e.g., sensors, a video display, a keyboard, a computer mouse, or other suitable device.

The at least one processor of the AWSP system may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the AWSP system and/or one or more programs, e.g., computer program code and/or a computer program product) adapted to direct the AWSP system.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor of the AWSP system (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

In an embodiment, a system including a plurality of wheels, a braking system, and one or more sensors is provided. The plurality of wheels includes a guardian wheel and at least one non-guardian wheel and is disposed on a wheeled vehicle. The braking system is operatively connected to the guardian and non-guardian wheels and applies a first braking force to the at least one non-guardian wheel and a second braking force to the guardian wheel. The second braking force increases a slide risk of the guardian wheel beyond a slide risk of the at least one non-guardian wheel. One or more sensors disposed within the wheeled vehicle detect sliding of the guardian wheel allowing a corrective action to be taken to prevent sliding of the at least one non-guardian wheel. The system may further include a controller (e.g., having one or more processors) that is configured, responsive to the sliding of the guardian wheel that is detected, to control the vehicle (e.g., the braking system) to take the corrective action to prevent sliding of the at least one non-guardian wheel. The control may be automatic, or may be based on operator manipulation of an operator controller responsive to annunciation (e.g., audio or visual display) of the detected sliding.

In certain embodiments, the system further includes an annunciator disposed in the wheeled vehicle and in communication with the one or more sensors, such that when the one or more sensors detect sliding of the guardian wheel, the annunciator signals that the guardian wheel is sliding. In certain embodiments, the second braking force is provided by at least one of a dynamic brake, a frictional brake and a hybrid brake. In certain embodiments, the system further includes an estimator and a designator. The estimator is disposed in the wheeled vehicle, is in communication with the one or more sensors, and estimates the adhesion requirement for each of the plurality of wheels. The designator is disposed in the wheeled vehicle, is in communication with the estimator, and designates one of the plurality of wheels as the guardian wheel based at least in part on the estimated adhesion requirement for each of the plurality of wheels. In certain embodiments, the system further includes a wheel guard disposed within the wheeled vehicle that reduces a magnitude of the second braking force applied to the guardian wheel. In certain embodiments, the system further includes an annunciator disposed in the wheeled vehicle that annunciates that the wheel guard has reduced the magnitude of the second braking force below a lower threshold. In certain embodiments, the system further includes a wheel guard disposed within the wheeled vehicle that applies motoring torque to the guardian wheel. In certain embodiments, the system further includes an annunciator disposed in the wheeled vehicle that annunciates that the wheel guard has applied motoring torque above an upper threshold. In certain embodiments, the wheeled vehicle is a rail vehicle.

In another embodiment, a traction control method for protecting wheels is provided. The method includes detecting that a first braking force has been applied to one or more non-guardian wheels of a plurality of wheels disposed on a wheeled vehicle. The method further includes applying a second braking force to a guardian wheel, the second braking force increasing a slide risk of the guardian wheel beyond a slide risk of the one or more non-guardian wheels. The method further includes detecting sliding of the guardian wheel. In certain embodiments, the method further includes annunciating that the guardian wheel is sliding. In certain embodiments, the second braking force is generated by at least one of a dynamic brake, a frictional brake, and a hybrid brake. In certain embodiments, the method may further include estimating the adhesion requirement for each of the plurality of wheels, and designating one of the plurality of wheels as the guardian wheel based at least in part on the estimated adhesion requirement for each of the plurality of wheels. In certain embodiments, the method may further include reducing a magnitude of the second braking force applied to the guardian wheel after detecting sliding of the guardian wheel. In certain embodiments, the method may further include annunciating that the magnitude of the second braking force has been reduced below a lower threshold. In certain embodiments, the method may further include applying a motoring torque to the guardian wheel after detecting sliding of the guardian wheel. In certain embodiments, the method may further include annunciating that the applied motoring torque has exceeded an upper threshold. In certain embodiments, the wheeled vehicle is a rail vehicle.

In yet another embodiment, another traction control method for protecting wheels is provided. The method includes detecting that a first braking force has been applied to one or more non-guardian wheels of a plurality of wheels disposed on a wheeled vehicle, each of the plurality of wheels having an adhesion requirement. The method further includes estimating the adhesion requirement for each of the non-guardian wheels. The method further includes taking a guardian action when the estimated adhesion requirement of at least one of the non-guardian wheels exceeds an upper threshold. In certain embodiments, taking the guardian action includes applying a second braking force to a guardian wheel such that the adhesion requirement of the guardian wheel is higher than the adhesion requirements of the non-guardian wheels.

In yet still another embodiment, another system including a plurality of wheels and a sensor is provided. The plurality of wheels includes a guardian wheel and one or more non-guardian wheels. The sensor detects sliding of the guardian wheel. When a first braking force is applied to the one or more non-guardian wheels, a second braking force is applied to the guardian wheel. The second braking force increases an adhesion requirement between a contact area of the guardian wheel and a surface.

Accordingly, by configuring a guardian wheel to slide prior to one or more non-guardian wheels, embodiments of the present invention enable for the early detection and warning that an operator is applying excessive braking force to the wheels of a wheeled vehicle. Once the sliding of the guardian wheel has been detected, corrected action can be taken to reduce the risk that the non-guardian wheels will slide. Reducing the risk that the non-guardian wheels will slide reduces the amount of unnecessary wear and/or damage to the non-guardian wheels. Thus, embodiments of the present invention extend the service lives of non-guardian wheels thereby reducing the overall operational costs of a wheeled vehicle. Additionally, reducing the risk of sliding of the non-guardian wheels also allows an operator to maintain better control over a wheeled vehicle.

The references herein are made in detail to exemplary embodiments of the invention, examples of which are illustrated in the accompanying drawings. Wherever possible, the same reference characters used throughout the drawings refer to the same or like parts, without duplicative description. Additionally, while the embodiments herein are shown and discussed in the context of rail vehicles, e.g. trains, other embodiments disclosed herein may apply to non-rail vehicles, such as cars and trucks (EV and HEV included), planes and/or other types of vehicles that traverse a surface via one or more wheels. For example, in embodiments of the invention implemented in EV/HEV cars and trucks. Additionally, other embodiments may be used in applications, apart from wheeled vehicles, in which one or more wheels are used to allow two or more structures and/or surfaces to move in relation to each other, e.g., conveyor belts, and/or other manufacturing devices.

Further, as used herein, an element or step recited in the singular and proceeded with the word a or an do not exclude plural of said elements or steps, unless such exclusion is explicitly stated. Additionally, references to one embodiment of the present invention are not intended to be interpreted as excluding the existence of additional embodiments that also incorporate the recited features. Moreover, unless explicitly stated to the contrary, embodiments comprising, including, or having an element or a plurality of elements having a particular property may include additional such elements not having that property. Furthermore, as used herein, the terms substantially, generally, and about indicate conditions within reasonably achievable manufacturing and assembly tolerances, relative to ideal desired conditions suitable for achieving the functional purpose of a component or assembly.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a plurality of wheels, including a guardian wheel and at least one non-guardian wheel, disposed on a wheeled vehicle;
a braking system operatively connected to the guardian wheel and the at least one non-guardian wheel, wherein the braking system is configured to apply a first braking force to the at least one non-guardian wheel and a second braking force to the guardian wheel, the second braking force increasing a slide risk of the guardian wheel beyond a slide risk of the at least one non-guardian wheel;
one or more sensors disposed within the wheeled vehicle that are configured to detect sliding of the guardian wheel allowing a corrective action to be taken to prevent sliding of the at least one non-guardian wheel;
an estimator, disposed in the wheeled vehicle and in communication with the one or more sensors, that is configured to estimate a respective adhesion requirement for each of the plurality of wheels; and
a designator, disposed in the wheeled vehicle and in communication with the estimator, that designates one of the plurality of wheels as the guardian wheel based at least in part on the estimated respective adhesion requirement for each of the plurality of wheels.

2. The system of claim 1, further comprising:
an annunciator disposed in the wheeled vehicle and in communication with the one or more sensors, such that, responsive to when the one or more sensors detect sliding of the guardian wheel, the annunciator is configured to signal that the guardian wheel is sliding.

3. The system of claim 1, wherein the second braking force is provided by at least one of a dynamic brake, a frictional brake, or a hybrid brake.

4. The system of claim 1 further comprising:
a wheel guard disposed within the wheeled vehicle that is configured to reduce a magnitude of the second braking force applied to the guardian wheel.

5. The system of claim 4 further comprising:
an annunciator disposed in the wheeled vehicle that is configured to annunciate that the wheel guard has reduced the magnitude of the second braking force below a lower threshold.

6. The system of claim 1 further comprising:
a wheel guard disposed within the wheeled vehicle that is configured to apply motoring torque to the guardian wheel.

7. The system of claim 6 further comprising:
an annunciator disposed in the wheeled vehicle that is configured to annunciate that the wheel guard has applied motoring torque above an upper threshold.

8. The system of claim 1, wherein the wheeled vehicle is a rail vehicle.

9. The system of claim 1 further comprising:
a controller configured to control the wheeled vehicle, responsive to the sliding of the guardian wheel that is detected, to take the corrective action to prevent sliding of the at least one non-guardian wheel.

10. A method comprising:
estimating an adhesion requirement for each of a plurality of wheels disposed on a wheeled vehicle;
designating one wheel of the plurality of wheels as a guardian wheel based at least in part on the estimated adhesion requirement for each of the plurality of wheels;
detecting that a first braking force has been applied to one or more non-guardian wheels of the plurality of wheels;
applying a second braking force to the guardian wheel, the second braking force increasing a slide risk of the guardian wheel beyond a slide risk of the one or more non-guardian wheels; and
detecting sliding of the guardian wheel.

11. The method of claim 10, the method further comprising:
annunciating that the guardian wheel is sliding.

12. The method of claim 10, wherein the second braking force is generated by at least one of a dynamic brake, a frictional brake and a hybrid brake.

13. The method of claim 10, the method further comprising:
reducing a magnitude of the second braking force applied to the guardian wheel after detecting sliding of the guardian wheel.

14. The method of claim 13, the method further comprising:
annunciating that the magnitude of the second braking force has been reduced below a lower threshold.

15. The method of claim 10, the method further comprising:
applying a motoring torque to the guardian wheel after detecting sliding of the guardian wheel.

16. The method of claim 15, the method further comprising:
annunciating that the applied motoring torque has exceeded an upper threshold.

17. The method of claim 10, wherein the wheeled vehicle is a rail vehicle.

18. A method comprising:
detecting that a first braking force has been applied to one or more non-guardian wheels of a plurality of wheels disposed on a wheeled vehicle, each of the plurality of wheels having an adhesion requirement;
estimating the adhesion requirement for each of the plurality of wheels;
designating one wheel of the plurality of wheels as a guardian wheel based at least in part on the estimated adhesion requirement for each of the plurality of wheels; and
taking a guardian action when the estimated adhesion requirement of at least one of the non-guardian wheels exceeds an upper threshold wherein the guardian action causes the guardian wheel to slide prior to the one or more non-guardian wheels.

19. The method of claim 18, wherein taking the guardian action comprises:
applying a second braking force to the guardian wheel such that the adhesion requirement of the guardian wheel is higher than the adhesion requirements of the non-guardian wheels.

20. A system comprising:
a plurality of wheels, including a guardian wheel and one or more non-guardian wheels, disposed on a wheeled vehicle, wherein an estimator, disposed in the wheeled vehicle and in communication with one or more sensors, is configured to estimate a respective adhesion requirement for each of the plurality of wheels, and wherein a designator, disposed in the wheeled vehicle and in communication with the estimator, is configured to designate one of the plurality of wheels as the guardian wheel based at least in part on the estimated respective adhesion requirement for each of the plurality of wheels;

the one or more sensors configured to detect sliding of the guardian wheel; and wherein, when a first braking force is applied to the one or more non-guardian wheels, a second braking force is applied to the guardian wheel, the second braking force increasing an adhesion requirement between a contact area of the guardian wheel and a surface.

* * * * *